June 14, 1932. R. P. DESCHAMPS 1,863,365
UNIVERSAL JOINT
Filed June 22, 1928

Inventor
Roger P. Deschamps,
by Eleanor M. Deschamps, Deceased
By her Attorneys Heir
Kenyon & Kenyon Patented June 14, 1932

1,863,365

UNITED STATES PATENT OFFICE

ROGER P. DESCHAMPS, DECEASED, LATE OF BRUSSELS, BELGIUM, BY ELEANOR M. DESCHAMPS, OF NEW YORK, N. Y., ANCILLARY EXECUTRIX

UNIVERSAL JOINT

Application filed June 22, 1928, Serial No. 287,612, and in Belgium June 23, 1927.

This invention relates to universal joints and has for an object an improved universal joint in which the lubrication is effected through the medium of centrifugal force resulting from a rotation of the joint.

Figure 1:
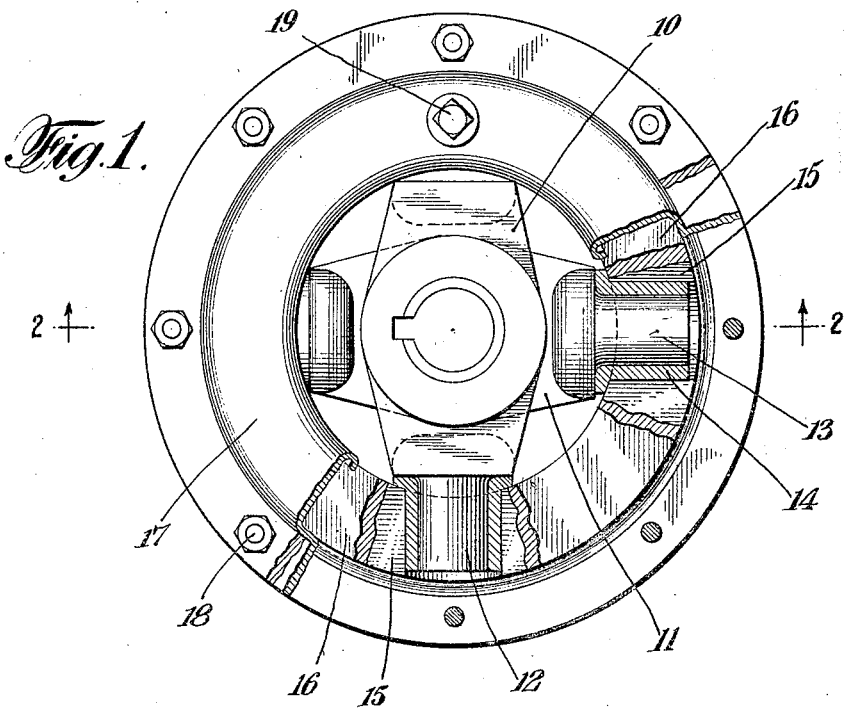
Figure 2:
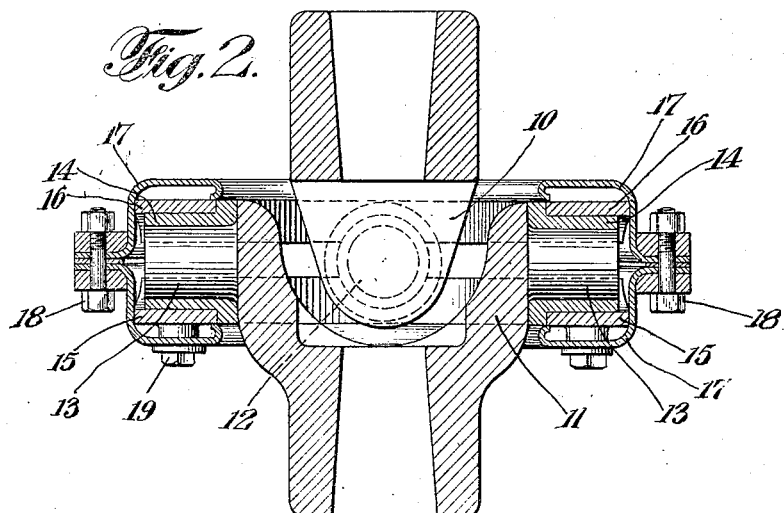

Other objects, novel features and advantages of this invention will be apparent from the following specification and accompanying drawing, wherein:

Fig. 1 is an end view, partly broken away, of a universal joint embodying the invention, and Fig. 2 is a section on the line 2—2 of Fig. 1.

The universal joint consists essentially of two yokes 10 and 11 equipped respectively with diametrically arranged outwardly projecting studs 12 and 13 respectively. The studs 12 and 13 are encased in bushings 14 which are received in sockets provided in the two annular members 15 and 16. The annular members 15 and 16 are clamped against the bushings by means of two rings 17 having flanges through which extend bolts 18 for fastening the same together. Each ring 17 is attached to one of the annular members 15 or 16 by means of two bolts 19 diametrically arranged with respect to each other and one pair of bolts being oriented 90° with respect to the other pair. The rings 17 form an enclosing housing for the joints as well as provide means for clamping the same in assembled relation.

The above described universal joint may be lubricated merely by placing the lubricant centrally thereof and causing it to be thrown outwardly by centrifugal force by rotation of the joint. The space left between the members 15 and 16 allows the lubricant to work out into contact with the enclosing casing 17 and at the same time be brought into lubricating relationship to the studs 12 and 13 respectively. In this way thorough lubrication of all parts is accomplished.

It is, of course, understood that various structural modifications may be made in the universal joint above described without in any way departing from the spirit of the invention as defined in the appended claim.

What is claimed is:—

A universal joint comprising a pair of yoke members having outwardly projecting studs, a pair of annular members having cooperating sockets to receive said studs, a pair of rings having portions engaging said annular members and being clamped together to hold the annular members in assembled relation and to provide an enclosing casing, said annular members being spaced whereby lubricant introduced centrally of the joint may be conveyed by centrifugal force between the faces of said studs and sockets.

In testimony whereof I have signed my name to this specification.

ELEANOR M. DESCHAMPS,
*Executrix of said Roger P. Deschamps, deceased.*